Figure 1:
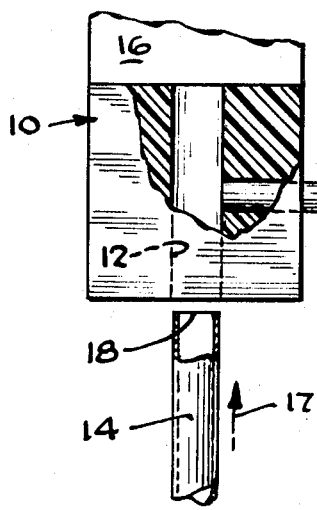

United States Patent

[11] 3,625,786

| [72] | Inventors | Whitney Lombard Pearson<br>Lake Bluff;<br>John Alexander Banford, Lake Bluff; Earl<br>Thaddeus Szymanski, Chicago, all of Ill. |
|---|---|---|
| [21] | Appl. No. | 864,949 |
| [22] | Filed | Oct. 2, 1969 |
| [45] | Patented | Dec. 7, 1971 |
| [73] | Assignee | Abbott Laboratories<br>North Chicago, Ill. |

[54] IMPLANT CAPSULE AND APPARATUS AND METHOD FOR MAKING SAME
6 Claims, 7 Drawing Figs.

[52] U.S. Cl.................................................. 156/69,
53/43, 156/510, 260/272
[51] Int. Cl...................................................... B29c 27/02,
B65b 7/28
[50] Field of Search............................................ 156/69,
510; 53/140, 43, 37, 39; 29/530; 206/42, 43, 65 A,
DIG. 23, DIG. 18

[56] References Cited
UNITED STATES PATENTS

| 3,527,015 | 9/1970 | Aronson et al. .............. | 53/37 |
| 1,728,171 | 9/1929 | Badger ......................... | 53/37 |
| 3,547,012 | 12/1970 | Amberg et al. ................ | 156/69 |

Primary Examiner—Samuel Feinberg
Assistant Examiner—James V. Doramus
Attorney—Robert L. Niblack ABSTRACT: A tubular capsule is sealed by forcing the tip of a rod into the end of the capsule cavity, preferably while the volume of the capsule is reduced. Apparatus suitable for use in a multistation capsule manufacturing operation is provided.

PATENTED DEC 7 1971 3,625,786

IMPLANT CAPSULE AND APPARATUS AND METHOD FOR MAKING SAME

This invention relates to the manufacture of capsules, particularly to a method and apparatus to manufacture capsules having a tubular body and a plug seal on at least one end.

The use of a polysiloxane carrier for controlled release of drugs and other agents is now well known and compositions suitable for such use are described by D. M. Long et al. in U.S. Pat. No. 3,279,996 and references cited therein, especially at column 4, lines 40–44. These silicone materials have admirable properties for physiological and pharmaceutical uses and provide a rate of release which is a function of the surface area of the capsule provided the drug is confined within the capsule by a positive seal. Unfortunately, such silicone rubbers cannot be heat sealed so that capsules cannot be produced by commonly employed techniques or by available apparatus. Seals dependent upon the application of a quantity of silicone polymer which is cured for hours are ill-adapted for mass production.

U.S. Pat. No. 2,844,363 to R. C. Clark, page 1, teaches that capsules of material such as polytetrafluoroethylene, which require heat sealing or fusing temperatures so high that the stability of the contained material is endangered, may be formed from threaded plugs having only the surface of the joint fused. This technique, however, requires the handling of many small parts which is economically uninviting.

It is an object of this invention to provide a process and apparatus for making capsules without the need for handling small parts. It is a further object to provide a method and apparatus for making a positive closure on a tubular capsule body without heat sealing. It is still further object to provide a method and apparatus for assembling capsules from a silicone controlled-release composition.

Another object of this invention is the provision of a method and apparatus for the manufacture of capsules having tubular bodies and plug ends which eliminate the need for preformed plugs. Another object of this invention is in the provision of a capsule having a reduced pressure therein.

These and other objects which will become apparent from the drawings and the following description are achieved through the provision of a method in which the plug material is supplied as a rod of substantial length, desirably more than several times the length of the plug to be formed and preferably more than about ten times the length of the plug. The tip of the rod, coated with adhesive on its longitudinal surfaces, is inserted into the end of the capsule following which the sealed end is severed from the rod. In a preferred embodiment, the capsule is sealed while a resilient wall is deformed to reduce the internal volume so that upon release of the restraint, the pressure within the capsule is less than atmospheric.

An apparatus is provided which supports the tubular capsule body, aligns the capsule end with the rod during the sealing operation, facilitates the application of an adhesive to the rod and severs the sealed capsule from the rod. The various components of the apparatus may be assembled by hand to perform the sequence of steps or may be arranged in operative position by a multistation machine of the type known in the art.

This invention may be employed to close the end of a tubular capsule in which one end is provided with a molded integral seal or the capsule may be made from a length of tubing both ends of which have been sealed according to the process of this invention. Thus, entire capsules may be fabricated from long lengths of tubing and rod without the need to manipulate small parts.

Referring to the drawings,

FIGS. 1–6 illustrate the steps of forming a semifinished capsule from a tube and a rod, depositing medicament in the central cavity of the capsule and sealing the filled capsule.

Figure 2:
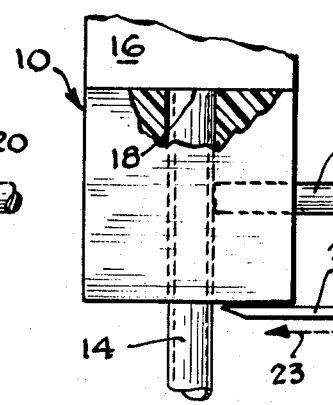
Figure 3:
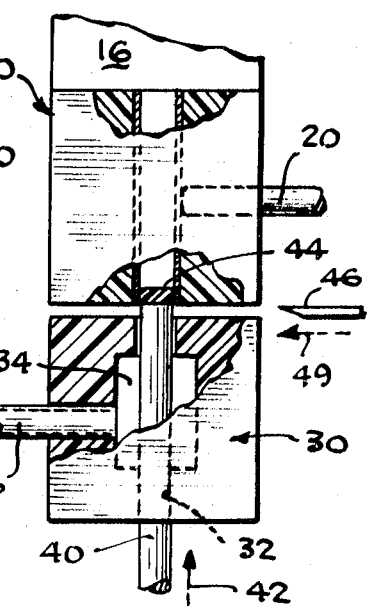
Figure 4:
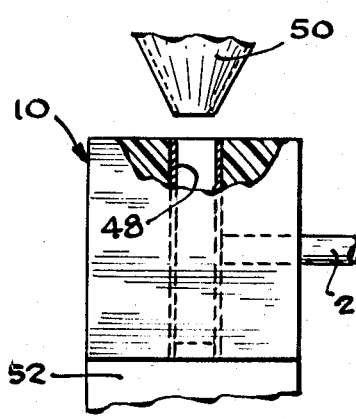
Figure 5:
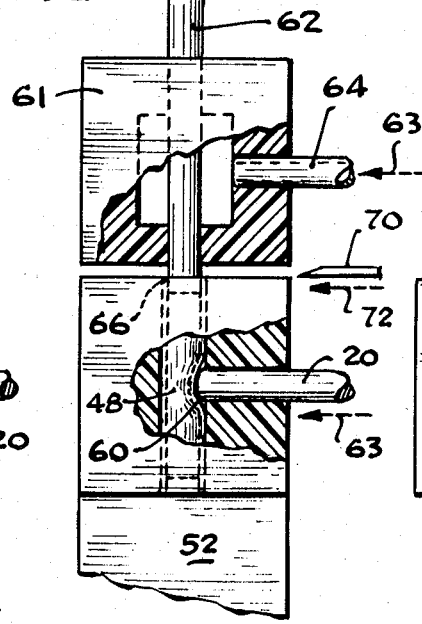
Figure 6:
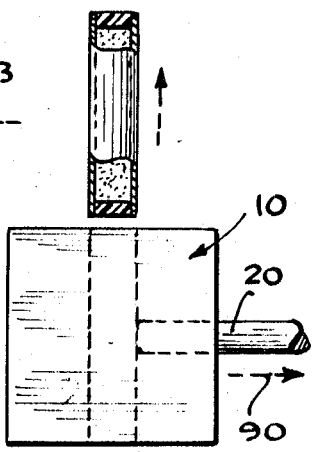
Figure 4A:
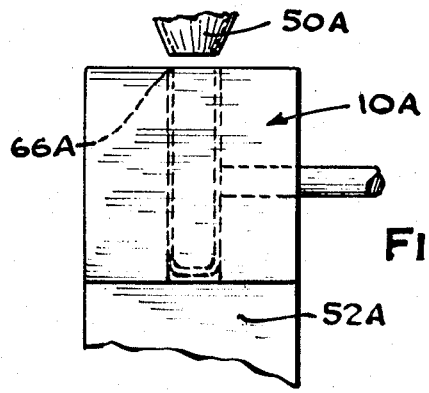

More particularly, FIG. 1 illustrates an arrangement of the apparatus at the start of the process, FIG. 2 shows tubing for the capsule body about to be cut to length, FIG. 3 shows the formation of a first end seal on the capsule body, FIG. 4 illustrates the filling of the semifinished capsule, FIG. 5 illustrates the final seal of the filled capsule and FIG. 6 illustrates the ejection of the finished capsule from the apparatus. FIG. 4A illustrates an alternate embodiment of the invention wherein the semifinished capsule body is provided as a unitary premolded element. The details of the process and apparatus are better understood from the following description of the formation of a capsule suitable for use as a veterinary hormonal implant. Such a capsule is inserted beneath the skin of the animal and is removed when hormones are no longer needed. The capsule is collapsed when recovered, partly from pressure of the animal tissue and partly from discharge of the hormone composition through the capsule wall. It should be understood that the following description is intended to be illustrative only and not limiting. Manufacture of single capsules is explained and repetitive operation of a substantially continuous nature is contemplated.

Referring now to FIG. 1, a block 10 has a chamber 12 extending therethrough and of such dimensions that it will receive the tube 14 which is to form the capsule body. The tube, of silicone rubber and with an inside diameter of about 0.132 inch and a wall thickness of about 0.025 inch, is moved toward the block as indicated by arrow 17 and the end 18 is received into the chamber 12. A punch 20, whose function will be explained later, extends toward the wall of the chamber 12. A stop 16 abuts the block 10 and one end of the chamber 12.

As shown in FIG. 2, the tube 14 is inserted into the chamber 12 until its end 18 abuts the stop 16. The knife 22 then advances in the direction indicated by arrow 23 and through the tube 14, severing a predetermined length of about 1.25 inches (31 mm.). The block 10, containing a length of tubing is next located as illustrated in FIG. 3.

In this step, the block 10 is positioned between a stop 16 and applicator body 30 which has a longitudinal passage 32 with a central arrangement 34. As the silicone rubber rod 40, which has a diameter of about 0.136 inch and is to form a plug for the cavity of the tube 14, is advanced through the passage 32 in the direction indicated by the arrow 42, silicone adhesive is supplied to the engagement 34 by line 36 so that the longitudinal surfaces of the rod are coated with adhesive. The coated rod is further advanced until about 0.125 inches (3mm.) of its tip 44 is located within the capsule tube body. The knife 46 then moves in the direction of the arrow 49 and shears the rod, leaving one end of the capsule body ssealed to provide a semifinished capsule body.

As shown in FIG. 4, the semifinished capsule body is advanced to a work station where its lower end may be supported by a stop 52 while the required amount of hormone composition is supplied by a filling mechanism 50. Some free space remains in the capsule after filling. Numerous filling mechanisms capable of depositing precisely measured quantities of medicament in the capsule cavity are known in the art and do not form part of this invention.

In FIG. 5, the block 10 with the hormone-containing semifinished capsule body 48 is aligned with applicator body 61 which is similar to body 30 shown in FIG. 3. The preferred negative pressure within the sealed capsule is developed by first reducing the volume of the capsule cavity and while it is so reduced, applying the finishing seal. The volume of the capsule is reduced by moving punch 20 as shown by arrow 63 to produce a deformation 60 in the capsule wall. Silicone rubber rod 62 is advanced and coated with silicone adhesive applied through line 64 and inserted into the end 66 of the capsule body. The operation is similar to that performed earlier and illustrated in FIG. 3. The knife 70 then travels as shown by arrow 72 to sever the end of the rod leaving a finished sealed capsule. When the punch 20 is withdrawn in the direction of arrow 90 after the final plug has been inserted, the resiliency of the capsule body restores the wall to its original shape, producing within the capsule a pressure slightly less than atmospheric.

In FIG. 6, the punch has returned to its original position and the filled and sealed capsule is ejected from the block 10.

As shown in FIG. 4A, a semifinished capsule body with an integrally molded seal on one end may be employed in an alternate embodiment. The filling station 50A is positioned over the open capsule end 66A. It is then filled and sealed in the manner illustrated in FIGS. 4 and 5 and ejected from the block 10A as shown in FIG. 6.

In the above exemplification, the block 10 and the applicator body 12 were manufactured from polytetrafluoroethylene which is a preferred material, but it will be clear to those skilled in the art that other materials, metal or plastic, could be used.

A superior seal is obtained when the outside diameter of the rod is equal to or slightly larger than the inside diameter of the tube so that an interference fit results. For example, with a tube having an inside diameter of 0.132 inch, excellent seals have been obtained when the outside diameter of the rod is from 0.132 inch to 0.140 inch. When both the rod and the capsule cavity have a circular cross section, it is beneficial to provide relative rotation between the capsule body and the rod as the rod seals in the open capsule end. Both tube and rod material may be supplied in lengths to make a plurality of capsules, e.g., as spools of 50 feet or more.

A preferred material for the capsule is a silicone rubber having a Durometer hardness of about 50 shore units, a minimum tensile strength of 1000 p.s.i. and an elongation more than about 360 percent.

Variations of the foregoing process may be employed. For example operations illustrated by FIGS. 1 and 3 may be combined by removing the stop 16 from the apparatus of FIG. 3 and supplying the capsule tube stock from above. The passage 32 of the applicator block 30 has a smaller diameter than the outside diameter of the capsule body, thus forming a shoulder against which the tube may seat while the tip of the rod 40 is inserted to seal the tube. Tube and rod may be then sheared simultaneously.

With some capsule materials, the shearing knives may not be needed, but the rod may be sheared to length by sliding the block 10 across the body 30, both of which will be of hardened material.

Some alteration in the sequence of the steps may be made without departing from the spirit of the invention. For example, the capsule wall may be deformed before the filling step rather than after as disclosed above, in which case, the deformation is continued until the final seal is made.

Without further explication, it is believed one skilled in the art, from the preceding description, is enabled to use this invention to its full test extent.

We claim:

1. The method of fabricating a capsule comprising the steps of providing a capsule body having a central cavity with an open end, locating adjacent said end a rod of capsule sealing material having a tip, applying adhesive to the longitudinal surface of the tip of said rod, inserting a portion of said rod into said capsule body to seal said end and severing the sealed capsule from said rod.

2. The method of claim 1 wherein the central cavity has a circular cross section and the rod has a cylindrical wall including, the step of providing relative rotation between the capsule body and rod as the rod is positioned to seal the capsule.

3. The method of claim 1 including the step of reducing the volume of the capsule cavity until the end is sealed.

4. The method of claim 3 wherein the volume of the capsule cavity is reduced by deformation of the wall of the capsule body.

5. The method of claim 1 wherein the rod is in interference fit with the capsule body.

6. The method of manufacturing a sealed capsule which comprises the steps of providing a capsule housing having a longitudinal passage, locating a capsule body in said passage, positioning the housing over an applicator block having a bore so that the passage of the housing and the bore of the block are coaxial, advancing a rod through said applicator block, applying adhesive to the longitudinal surface said rod as it passes through said block, inserting said rod into said capsule body and severing said sealed capsule from said rod.

* * * * *